United States Patent Office 3,526,005
Patented Sept. 1, 1970

3,526,005
METHOD OF PREPARING AN INTRAVASCULAR DEFECT BY IMPLANTING A PYROLYTIC CARBON COATED PROSTHESIS
Jack C. Bokros, San Diego, and Willard H. Ellis, Encinitas, Calif., assignors, by mesne assignments, to Gulf General Atomic Incorporated, San Diego, Calif., a corporation of Delaware
No Drawing. Filed June 29, 1967, Ser. No. 649,811
Int. Cl. A61f *1/22, 1/24*
U.S. Cl. 3—1                    6 Claims

ABSTRACT OF THE DISCLOSURE

A prosthetic device for implantation in or use with a living body. A substrate is coated with impervious isotropic pyrolytic carbon which provides an inert and antithrombogenic outer surface. The conditions at which the pyrolytic carbon is deposited are controlled to match the thermal coefficient of expansion of the pyrolytic carbon to that of the substrate and to provide a strong carbon which contributes substantial structural strength to the composite prosthetic device.

---

This invention relates generally to prosthetic devices and more particularly to prosthetic devices for use within a living body.

Prosthetic devices, such as intravascular prostheses, have been used for a number of years, and it is expected that usage of such devices will increase in the future as medical expertise continues to improve. One example is the artificial heart valve which is used fairly extensively today, and more complex circulatory assist devices are currently under development. Artificial kidneys are another class of prosthetic devices becoming more and more available.

In order to further the development and utilization of prosthetic devices, the surfaces of these devices which come in contact with blood and tissues should be completely compatible therewith, whether the contact be made by implantation or insertion within the body or by passage therethrough of blood at locations exterior of the body. Two of the most common materials for intravascular prosthesis are metals, for applications where high strengths and good wearability are important, and plastics for applications wherein flexibility is needed. Metals are thrombogenic and are subject to corrosion. Plastics, without some treatment, are also thrombogenic and are subject to degradation. Stainless steel and tantalum are among the most popular metals used today, whereas polyethylene, Teflon and the polycarbonates are examples of plastics considered suitable. None of these materials are considered to be totally satisfactory for the construction of prosthetic devices.

It is an object of the present invention to provide improved prosthetic devices by utilizing improved materials of construction. One further object is to provide an improved method for repairing an intravascular defect within a living body. These and other objects of the invention should be clearly apparent from the following description relating to the fabrication and use of devices embodying various features of the invention.

It has been found that prosthetic devices having improved characteristics can be made by coating suitable substrates of the desired shape and size with isotropic pyrolytic carbon. Isotropic pyrolytic carbon has been found not only to significantly increase the strength of the substrate upon which it is coated, but also to resist wear and deterioration even if implanted within a living body for long periods of time. While reference is hereinafter generally made to use of the prosthetic devices in combination with a human body, wherein of course the primary use is considered likely to occur, it should also be recognized that the improved prosthetic devices may likewise be used in other living mammals. For example, it may be desirable to use pins which include the indicated pyrolytic carbon coatings for use in repairing or setting broken bones in horses or dogs.

To endow the prosthetic devices with the above-mentioned desirable characteristics, it has been found that the pyrolytic carbon should be isotropic. Preferably, it is considered that the pyrolytic carbon should have a BAF (Bacon Anisotropy Factor) of not more than 1.3. The BAF is an accepted measure of preferred orientation of the layer planes in the carbon crystalline structure. The technique of measurement and a complete explanation of the scale of measurement is set forth in an article by G. E. Bacon entitled "A Method for Determining the Degree of Orientation of Graphite" which appeared in the Journal of Applied Chemistry, volume 6, page 477 (1956). For purposes of explanation, it is noted that 1.0 (the lowest point on the Bacon scale) signifies perfectly isotropic carbon.

In general, the thickness of the outer pyrolytic carbon coating should be sufficient to impart the necessary stress and strain fracture strengths to the particular substrate being coated. For example, if a fairly weak substrate is being employed, for instance one made of artificial graphite, it may be desirable to provide a thicker coating of pyrolytic carbon to strengthen the composite prosthetic device.

The density of the pyrolytic carbon is considered to be an important feature in determining the additional strength which pyrolytic carbon coating will provide the substrate. The density is further important in assuring that the pyrolytic carbon surface which will be exposed to body tissue or to blood in the environment wherein it will be used is smooth and substantially impervious. Such surface characteristics are believed to reduce the tendency of blood to coagulate on the surface of the prosthetic device. It is considered that the pyrolytic carbon should at least have a density of about 1.5 grams per cc.

A further characteristic of the carbon which also affects the strength contribution thereof is the crystallite height or apparent crystallite size. The apparent crystallite size is herein termed $L_c$ and can be obtained directly using an X-ray diffractometer. In this respect $$L_c = \frac{0.89\lambda}{\beta \cos \theta} A.$$

wherein:

$\lambda$ is the wave length in A.
$\beta$ is the half-height (002) line width, and
$\theta$ is the Bragg angle It is considered that the pyrolytic carbon coatings for use in prosthetic devices should have a crystalline size no greater than about 200 A. In general, it may be said that the desirable characteristics of the pyrolytic carbon for use in prosthetic devices are greater when the apparent crystallite size is small and that preferably the apparent crystallite size is between about 20 and about 50 A.

Because in general the substrate material for the prosthetic device will be completely encased in pyrolytic carbon, or at least will have its surfaces covered with pyrolytic carbon which would otherwise be in contact with either body tissue or the blood, choice of the material from which to form the substrate is not of utmost importance. For example, if the particular prosthetic device is a pin or a small tube or a portion of a valve for implantation within the human body, it is likely that the prosthetic device would be completely covered with pyrolytic carbon. However, if the prosthetic device is a part of an apparatus which is to be used exterior of the body, for example, as a part of an auxilary blood pump, it may be necessary to coat only the surfaces which will come in contact with the blood.

Because the substrate material may in many instances be completely surrounded by pyrolytic carbon, it is considered very important that the substrate material be compatible with pyrolytic carbon, and more particularly suitable for the process for coating with pyrolytic carbon. Although, as previously indicated, it is desirable that the substrate material have good structural strength to resist possible failure during its end use, substrate materials which do not have high structural strengths may be employed by using the pyrolytic carbon deposited thereupon to supply the required additional structural strength for the prosthetic device.

Because pyrolytic carbon is, by definition, deposited by the pyrolysis of a carbon-containing substance, the substrate material is subjected to the fairly high temperatures necessary for pyrolysis. Generally, hydrocarbons are employed as the carbon-containing substance to be pyrolyzed, and temperatures of at least about 1000° C. are needed. Some examples of the deposition of pyrolytic carbon to produce coated articles having increased stability under high temperature and neutron irradiation conditions are set forth in U.S. Pat. 3,298,921. The processes illustrated and described in this U.S. patent employ methane as the source of carbon and utilize temperatures generally in the range from about 1500 to 2300° C. Although it may be possible to deposit pyrolytic carbon having the desired properties with regard to the instant invention at somewhat lower temperatures by using other hydrocarbons, for example, propane or butane, generally it is considered that the substrate material should remain substantially unaffected by temperatures of at least about 1000° C., and preferably by even higher temperatures.

Because the substrate is coated at the aforementioned relatively high temperatures although the prosthetic device will be actually employed at temperatures which will usually be very close to ambient, the coefficients of thermal expansion of the substrate and of the pyrolytic carbon deposited thereupon should be relatively close to each other if the pyrolytic carbon is to be deposited directly upon the substrate and a firm bond therebetween is to be established. Whereas in the aforementioned U.S. patent there is description of the deposition of an intermediate low density pyrolytic carbon layer, the employment of which might provide somewhat greater leeway in matching the coefficients of thermal expansion, it is preferable to deposit the pyrolytic carbon directly upon the substrate and therefore avoid the necessity for such an additional intermediate layer. Pyrolytic carbon having the desired characteristics can be deposited having a thermal coefficient of expansion in the range of between about 3 and about $6 \times 10^{-6}/°$ C. Accordingly, substrate materials are chosen which have the aforementioned stability at high temperatures and which have thermal coefficients of expansion within this general range. Examples of suitable substrate materials include artificial graphite, boron carbide, silicon carbide, tantalum, molybdenum, tungsten, and various ceramics, such as mullite.

The pyrolytic carbon coating is applied to the substrate using a suitable apparatus for this purpose. Preferably, an apparatus is utilized which maintains the substrate in motion while the coating process is carried out to assure that the coating is uniformly distributed on the desired surfaces of the substrate. A rotating drum coater or a vibrating table coater may be employed. When the substrates to be coated are small enough to be levitated in an upwardly flowing gas stream, a fluidized bed coater is preferably used. By coating in this manner, the desired smoothness of the carbon surface is obtained.

As discussed in detail in the aforementioned U.S. patent, the characteristics of the carbon which are deposited may be varied by varying the conditions under which pyrolysis is carried out. For example, in a fluidized bed coating process wherein a mixture of a hydrocarbon gas, such as methane, and an inert gas, such as helium or argon, is used, variance in the volume percent of methane, the total flow rate of the fluidizing gas stream, and the temperature at which pyrolysis is carried out all affect the characteristics of the pyrolytic carbon which is deposited. Control of these various operational parameters not only allows deposition of pyrolytic carbon having the desired density, apparent crystallite size, and isotropy, but also permits regulation of the desired thermal coefficient of expansion which the pyrolytic carbon has. This control also allows one to "grade" a coating in order to provide a variety of exterior surfaces. For example, if an oriented coating is desirable for certain applications, one could deposit a base isotropic coating with a BAF of 1.3 or less and, in a final coating step, change the conditions to obtain an oriented thin outer layer.

As indicated above, a substrate material is chosen which has a thermal coefficient of expansion of between about 3 and about $6 \times 10^{-6}/°$ C., and the carbon deposition conditions are controlled so that the pyrolytic carbon has a coefficient within the same range. Generally, when pyrolytic carbon is deposited directly upon the surface of the substrate material, the pyrolysis conditions are controlled so that the pyrolytic carbon which is deposited has a coefficient of expansion matched to within about plus or minus 50% of the substrate material's thermal coefficient of expansion, and preferably to within about plus or minus 20% thereof. Because pyrolytic carbon has greater strength when placed in compression than when placed in tension, the thermal coefficient of expansion of the pyrolytic carbon most preferably is about equal to or less than that of the substrate. Under these conditions, good adherence to the substrate is established and maintained during the life of the prosthetic devices. Inasmuch as many of these devices may be employed for implantation within the human body, it is extremely important that long life of the device without degradation be assured.

Pyrolytic carbon having the aforementioned physical properties is considered to be particularly advantageous for constituting the surface for a prosthetic device because it is antithrombogenic and is inert to the metabolic processes, enzymes, and other juices found within living bodies. The antithrombogenic properties of pyrolytic carbon are believed to be dependent upon its sterility and the removal of all the oxygen therefrom. Before use, the device may be sterilized, for example, by heating in an ethylene oxide atmosphere for about six hours at about 130° F., followed by degassing for a sufficient time, for example, for about twenty hours at about 1 p.s.i.a. and 100° F.

As an alternative to the foregoing sterilization and degassing techniques, the prosthetic devices can be treated with a suitable anticoagulant which safeguards against the occurrence of thrombosis. An anticoagulant such as heparin can be used. Application may be simply made by dipping the prosthetic device in a heparin solution. A suitable heparin solution may be prepared by mixing 2 cc. of heparin to 30 cc. of saline, saline being a solution of sodium chloride in water. The absorption of heparin by the pyrolytic carbon surface may be improved by pretreatment with a cationic, surface-active agent such as an aqueous solution of benzalkonium chloride.

The sterilized or otherwise treated prosthetic device is ready for its intended use, for example as a part of apparatus that will function exterior of a living body, or perhaps as an implant within a living body to repair an intravascular defect. Known procedures for securing the pyrolytic carbon-coated device in the proper location within the body may be used, for example, joined with Dacron cloth and appropriately sutured using standard suturing methods.

The following examples illustrate several processes for producing prosthetic devices having pyrolytic carbon surfaces which have various advantages of the invention. Although these examples include the best modes presently contemplated by the inventors for carrying out their invention, it should be understood that these examples are only illustrative and do not constitute limitations upon the invention which is defined by the claims appearing at the end of this specification.

EXAMPLE I

Short tubes are constructed of artificial graphite each having a length of 9 mm., an internal diameter of 7 mm. and a wall thickness of 0.5 mm. The artificial graphite employed has a coefficient of thermal expansion of about $4 \times 10^{-6}/°$ C. when measured at 50° C. The short tubes are coated with pyrolytic carbon using a fluidized bed coating apparatus.

The fluidized bed apparatus includes a reaction tube having a diameter of about 3.8 cm. that is heated to a temperature of about 1350° C. A flow of helium gas sufficient to levitate the relatively small tubes is maintained upward through the apparatus. The small short tubes are coated together with a charge of pre-coated thorium carbide particles of about 50 grams, which particles have diameters in the range of about 150 to 250 microns. The particles are added along with the short tubes to provide a deposition surface area of the desired amount relative to the size of the region of the reaction tube wherein pyrolysis occurs inasmuch as the relative amount of available surface area is another factor which influences the characteristics of the resultant pyrolytic carbon.

When the temperature of the articles which are levitated within the reaction tube reaches about 1350° C., propane is admixed with the helium to provide an upwardly flowing gas stream having a total flow rate of about 6000 cc. per minute and having a partial pressure of propane of about 0.4 (total pressure one atmosphere). The propane decomposes under these conditions and deposits a dense isotropic pyrolytic carbon coating upon all of the articles in the fluidized bed. Under these coating conditions, the carbon deposition rate is about one micron per minute. The propane gas flow is continued until an isotropic pyrolytic carbon coating about 200 microns thick is deposited on the outside of the tubes. At this time, the propane gas flow is terminated, and the coated articles are cooled fairly slowly in the helium gas and then removed from the reaction tube coating apparatus.

The short tubes are examined and tested. The thickness of the pyrolytic carbon coating on the interior of the tubes measures about 200 microns. The density of the isotropic carbon uniformly is found to be about 2.0 grams per cc. The BAF is found to be about 1.1. The apparent crystallite size is measured and found to be about 30 to 40 A. Mechanical tests of the coated short tubes are made to determine their strength in comparison to additional uncoated graphite tubes. The crushing load of the uncoated graphite tubes, loaded parallel to the diameter, is found to be about four pounds. The crushing load of the coated tubes is about twenty-five pounds, about six times higher. Another of the coated tubes is sterilized by heating to about 1000° C. in a vacuum and then is soaked for fifteen minutes in a dilute solution of benzalkonium chloride (1 part by 1000 parts water). The coated tube is then removed, rinsed and then soaked for fifteen minutes in a heparin solution prepared by adding 2 cc. of heparin to 30 cc. of saline. After removal, the tube is rinsed ten times with distilled water and is then tested with blood. After contact with blood for about twenty-four hours, no sign of clotting is shown, and clotting normally occurs within a matter of minutes. The pyrolytic carbon-coated graphite substrate articles are considered to be excellently acceptable for use as prosthetic devices within the body of human beings.

EXAMPLE II

A number of short tubes having the same dimensions as those used in Example I but made of tantalum are provided. Tantalum has a thermal coefficient of expansion of about $6.5 \times 10^{-6}/°$ C., measured at 20° C. The short tubes are coated in the fluidized bed reaction tube employed in Example I. In order to match the pyrolytic carbon coefficient of thermal expansion to that of the tantalum substrate, a coating temperature of 1600° C. is employed using a 15% propane-85% helium gas stream having a total flow rate of about 6000 cc. per minute. The short tubes are levitated together with a similar 50 gram charge of particles of thorium carbide. Deposition of pyrolytic carbon is carried out for about 20 minutes, after which period a layer of isotropic pyrolytic carbon about 150 microns thick coats the outer surface of each of the tubes. At the end of this time the propane flow is discontinued, and the coated tubes are cooled and removed from the reaction tube.

Examination and testing shows that the density of the isotropic pyrolytic carbon deposited is about 1.6 grams per cc. The BAF is about 1.0. The apparent crystallite size is between about 50 to 60 A. The thermal coefficient of expansion of the pyrolytic carbon measures about $5 \times 10^{-6}/°$ C. at about 20° C. Mechanical testing of the coated tubes shows that the strength and wearability is acceptable and that the coating is firmly affixed to the substrate.

One of the coated short tubes is sterilized and treated as in Example I with benzalkonium chloride and heparin and is tested with blood. There is no sign of clotting after contact therewith for twenty-four hours. The carbon-coated tantalum articles are considered to be excellently acceptable for use as a part of a prosthetic device for implantation within a human body.

EXAMPLE III

A number of short tubes having the same dimensions as those used in Example I but made of tungsten are provided. Tungsten has a thermal coefficient of expansion of about $4.4 \times 10^{-6}/°$ C., measured at 27° C. The short tubes are coated in the fluidized bed reaction tube employed in Example I. In order to match the pyrolytic carbon coefficient of thermal expansion to that of the tungsten substrate, a coating temperature of 1600° C. is employed using a 15% propane-85% helium gas stream having a total flow rate of about 6000 cc. per minute. The short tubes are levitated together with a similar 50 gram charge of particles of thorium carbide. Deposition of pyrolytic carbon is continued for about 20 minutes at which time a layer of isotropic pyrolytic carbon about 150 microns thick coats the outer surface of each of the tubes. The propane flow is discontinued, and the coated tubes are cooled and removed from the reaction tube.

Examination and testing shows that the density of the isotropic pyrolytic carbon deposited is about 1.6 grams per cc. The BAF is about 1.0. The apparent crystallite size is between about 50 to 60 A. The thermal coefficient of expansion of the pyrolytic carbon measures about $5 \times 10^{-6}/°$ C. at about 20° C. Mechanical testing of the coated tubes shows that the strength and wearability is acceptable and that the coating is firmly affixed to the substrate.

One of the coated short tubes is sterilized and treated as in Example I with benzalkonium chloride and heparin and tested with blood. There is no sign of clotting after contact therewith for twenty-four hours. The carbon-coated tungsten articles are considered to be excellently acceptable for use as a part of a prosthetic device for implantation within a human body.

EXAMPLE IV

A number of short tubes having the same dimensions as those used in Example I but made of molybdenum are provided. Molybdenum has a thermal coefficient of expansion of about $5.3 \times 10^{-6}/°$ C., measured at 20° C. The short tubes are coated in the fluidized bed reaction tube employed in Example I. In order to match the pyrolytic carbon coefficient of thermal expansion to that of the molybdenum substrate, a coating temperature of 1350° C. is employed using a 30% propane-70% helium gas stream having a total flow rate of about 5500 cc. per minute. The short tubes are levitated together with a similar 50 gram charge of particles of thorium carbide. Deposition of pyrolytic carbon occurs and after about 30 minutes a layer of isotropic pyrolytic carbon about 100 microns thick coats the outer surface of each of the tubes. At the end of this time the propane flow is discontinued, and the coated tubes are cooled and removed from the reaction tube.

Examination and testing shows that the density of the isotropic pyrolytic carbon deposited is about 2.0 grams per cc. The BAF is about 1.1. The apparent crystallite size is between about 30 and 40 A. The thermal coefficient of expansion of the pyrolytic carbon measures about $5 \times 10^{-6}/°$ C. at about 20° C. Mechanical testing of the coated tubes shows that the strength and wearability is acceptable and that the pyrolytic carbon coating is firmly bonded to the substrate.

One of the coated short tubes is sterilized and treated as in Example I with benzalkonium chloride and heparin and is tested with blood. There is no sign of clotting after contact therewith for twenty-four hours. The carbon-coated molybdenum short tubes are considered to be excellently acceptable for use as a part of a prosthetic device for implantation within a human body.

Although the examples have been particularly directed to the coating and use of short tubes, it should be understood that this is for purpose of illustration only and that it is considered that any suitably-shaped elements can be coated to provide prosthetic devices. In particular, it is to be noted that deposition of pyrolytic carbon in a fluidized bed process is excellently suited for the smooth coating of even the most complex shape of element. The foregoing shows that prosthetic devices are provided which have excellent resistance to degradation in a living body and, as such, are eminently well suited for prosthetic devices which can be implanted permanently within a living human being. Pyrolytic carbon-coated substrates containing radioactive isotopes for internally treating diseases, such as cancer or tumors, are illustrative of another form of improved prosthetic device that may be produced. Various features of the invention are set forth in the following claims.

What is claimed is:

1. A method of repairing an intravascular defect in a living body which method comprises providing a substrate for a prosthetic device having the general shape and size desired, coating said substrate with a layer of dense pyrolytic carbon to complete the construction of said prosthetic device, and inserting said prosthetic device into a living body.

2. A method in accordance with claim 1 wherein said prosthetic device is treated with an anticoagulant to assure it is antithrombogenic before insertion into the body.

3. A method in accordance with claim 1 wherein said layer of pyrolytic carbon has a density of at least about 1.5 grams per cc.

4. A method in accordance with claim 1 wherein said layer of pyrolytic carbon has an apparent crystalline size of less than about 200 A.

5. A method in accordance with claim 1 wherein said layer of pyrolytic carbon has a BAF of not greater than about 1.3.

6. A method in accordance with claim 1 wherein said layer of pyrolytic carbon is at least about 50 microns thick.

References Cited

UNITED STATES PATENTS

| | | | |
|---|---|---|---|
| 3,298,921 | 1/1967 | Bokros et al. | 117—100 XR |
| 3,317,338 | 5/1967 | Batchelor | 117—46 |
| 3,325,363 | 6/1967 | Goeddel et al. | 117—46 XR |
| 3,425,418 | 2/1969 | Chvapil et al. | 128—334 |

OTHER REFERENCES

"The coating of intravascular plastic prostheses with colloidal graphite," by V. L. Gott et al., Surgery, vol. 50, No. 2, August 1961, pages 382-389.

"Replacement of the Canine Pulmonary Valve and Pulmenary Artery with a Graphite-Coated Valve Prosthesis," by V. L. Gott et al., Journal of Thoracic and Cardiovascular Surgery, vol. 44, No. 6, December 1962, pages 713-721.

RICHARD A. GAUDET, Primary Examiner

R. L. FRINKS, Assistant Examiner

U.S. Cl. X.R.

117—46; 128—1, 92, 334

UNITED STATES PATENT OFFICE
CERTIFICATE OF CORRECTION

Patent No. 3,526,005                Dated September 1, 1970

Inventor(s) Jack C. Bokros and Willard H. Ellis

It is certified that error appears in the above-identified patent and that said Letters Patent are hereby corrected as shown below:

Column 1, in the Title - the word "PREPARING" should read "REPAIRING".

Column 1, line 46 - the word "strengths" should read "strength".

SIGNED AND SEALED
NOV 3 1970

NOV. 3, 1970

(SEAL)
Attest:

Edward M. Fletcher, Jr.
Attesting Officer

WILLIAM E. SCHUYLER, JR.
Commissioner of Patents